H. FISHER.
HORSE HAY-FORK.

No. 186,468. Patented Jan. 23, 1877.

Witnesses,
Henry Orth
H. H. Bliss

Inventor
Henry Fisher
by Abbott & Co attys

UNITED STATES PATENT OFFICE.

HENRY FISHER, OF CANTON, OHIO.

IMPROVEMENT IN HORSE HAY-FORKS.

Specification forming part of Letters Patent No. 186,468, dated January 23, 1877; application filed October 17, 1876.

*To all whom it may concern:*

Be it known that I, HENRY FISHER, of Canton, in the county of Stark and State of Ohio, have invented certain new and useful Improvements in Horse Hay-Forks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention relates to an improvement in hay-forks; and it consists in a construction and arrangement of parts whereby the loading, locking, and unloading are readily effected.

Figure 1:
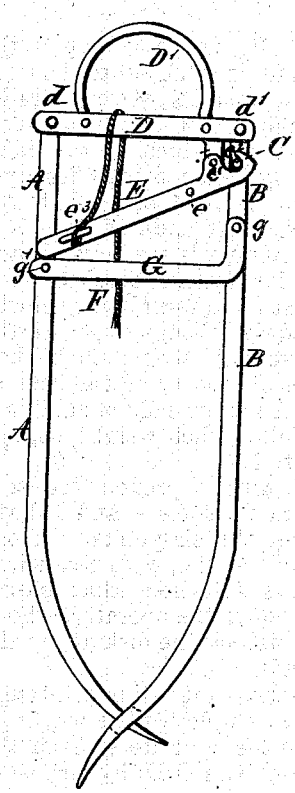
Figure 2:
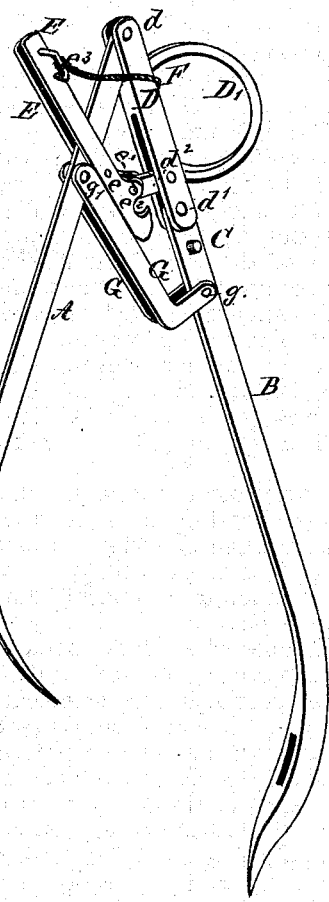

Figure 1 in the drawings represents a plan view of my improved hay-fork, and shows the position of the parts when the fork is loaded and locked. Fig. 2 is a perspective view, representing the position of the parts when the load is being dropped.

A and B are the tines of the fork, made of steel or other suitable material, and at their lower ends they are curved inward sufficiently to allow their points to slightly cross each other. The tine B is provided with a slot, recess, or mortise near its point, through or into which passes the point of tine A, when it is desired to lock the fork, and at a short distance from the upper end of B is a stud or pin, C, passing through and projecting from both faces of the tine, for purposes that will hereafter more fully appear. At their upper ends the tines are hinged by means of pivots $d$ $d^1$, between two cross-bars, D D.

From an examination of the drawings it will be seen that by this construction of the tine B I am enabled to accomplish with it two important objects—viz., the forming of a solid link around the load by passing the point of tine A through the slot in tine B, and the immediate discharge of the load by allowing tine B to swing away from the load.

Between these bars D D, and between the hinges of the tines, a staple or loop, D', is riveted, one of whose arms extends below the bars D, as shown at $d^2$, to which arm is pivoted the locking-latch. This projection $d^2$ also prevents the points of the tines from crossing each other too far. By means of loop D' the hoisting rope or chain is attached to the fork.

The locking-latch consists of two parallel bars, E E, one moving upon the front sides, the other upon the rear sides, of the tines. These bars are firmly fastened together by a rivet, $e$, and are hinged by a pivot, $e^1$, to the arm $d^2$ of loop D'. The ends of bars E E which extend toward tine B are beveled, and near the same end they are notched upon their upper edges, so as to form lugs or hooks $e^2$, which lock the fork by engaging with the studs C. As the pivot $e^1$ is between the hooked ends and the center of gravity of the bars E, it is manifest that the other ends of said bars will, when free to fall by their weight, engage hooks $e^2$ with the studs C.

I find it advantageous to prevent the locking of the fork until the tines A and B have been linked together at their points. To one of the bars E a small staple, $e^3$, is riveted, to which a cord, F, is attached, that passes through loop D' down to the operator, who is thereby enabled to unlock the fork at any desired point of unloading.

In order to guide the point of tine A through the slot in tine B, I employ two bars, G G, which are hinged to the opposite sides of the tines, below the cross-bars D D, by means of pivots $g$ $g'$. These bars G, in conjunction with bars D, compel the point of each tine to always describe the same path relative to the point of the other. The pivots $g$ $g'$ are unequally distant from the upper ends of the respective tines to which they are pivoted, the one upon tine B being nearer to said end than the one upon tine A; and as the line from $g$ to $g'$ is not parallel to the line from $d$ to $d^1$, it will be seen that the points of the tines are, when the tines are spread, thrown farther apart than would be if said lines were parallel, thus securing a more rapid discharge of the load.

It may be found convenient to dispense with one of the locking-bars E, and instead of the bars D D and the guide-pieces G G, solid cross-bars may be employed, properly slotted to permit the hinging of the tines.

Other modifications may be made without materially altering the construction or operation of the fork.

The operation is simple, and will be readily understood from the foregoing description. Tine B is first inserted and pressed down into the hay, after which the other tine is pressed down until the fork is locked. The load is then elevated to the desired point, when, by a slight pull upon the cord F, the lock is raised and the load dropped.

What I claim as new, and desire to secure by Letters Patent, is—

1. A hay-fork having its tines hinged together by means of stiff cross-bars, each of which is pivoted to both tines in a line not parallel to the line upon which the other bar is pivoted, substantially as and for the purpose set forth.

2. The combination of bars D and locking-levers E with slotted tine B and tine A, passing through tine B, substantially as and for the purposes set forth.

3. The combination of cross-bars D, tines A and B, pivoted thereto, guide-bars G, and projection $d^2$, substantially as and for the purposes set forth.

4. Tine A, tine B, cross-bars D, loop D', and arm $d^2$, in combination with guide-bars G, locking-levers E, studs C, and cord F, substantially as forth.

In testimony that I claim the foregoing as my own I affix my signature in presence of of two witnesses.

HENRY FISHER.

Witnesses:
    GEO. W. RAFF,
    P. S. SOWERS.